US011878541B2

(12) United States Patent
Atzmon et al.

(10) Patent No.: US 11,878,541 B2
(45) Date of Patent: Jan. 23, 2024

(54) SCRATCH-OFF STRUCTURE PRODUCTION

(71) Applicant: HP INDIGO B.V., Amstelveen (NL)

(72) Inventors: Yavin Atzmon, Ness Ziona (IL); Inna Tzomik, Ness Ziona (IL)

(73) Assignee: HP INDIGO B.V., Amstelveen (NL)

( * ) Notice: Subject to any disclaimer, the term of this patent is extended or adjusted under 35 U.S.C. 154(b) by 174 days.

(21) Appl. No.: 17/153,113

(22) Filed: Jan. 20, 2021

(65) Prior Publication Data

US 2021/0138816 A1 May 13, 2021

Related U.S. Application Data

(62) Division of application No. 16/606,218, filed as application No. PCT/EP2017/074333 on Sep. 26, 2017, now Pat. No. 10,906,340.

(51) Int. Cl.
*B41M 3/00* (2006.01)
*A63F 3/06* (2006.01)
*B42D 15/02* (2006.01)

(52) U.S. Cl.
CPC .......... *B41M 3/005* (2013.01); *A63F 3/0665* (2013.01); *B42D 15/025* (2013.01)

(58) Field of Classification Search
CPC ........ B41M 3/005; B41M 3/00; A63F 3/0665; A63F 3/06; B42D 15/025; B42D 15/02
USPC ................ 283/67, 72, 94, 98, 100, 107, 901
See application file for complete search history.

(56) References Cited

U.S. PATENT DOCUMENTS

2004/0150220 A1 8/2004 Holmes et al.
2007/0223690 A1* 9/2007 Golle ...................... G09C 5/00 380/55
2010/0253063 A1 10/2010 Skogster
2011/0140408 A1 6/2011 Scrymgeour et al.
2012/0018994 A1 1/2012 Stalker et al.
2013/0195520 A1* 8/2013 Pickering ............... G03G 13/34 399/320
2015/0165484 A1 6/2015 Deppermann et al.
2017/0157967 A1 6/2017 Lavoie et al.
2018/0020126 A1* 1/2018 Weil ..................... A63F 3/0655

FOREIGN PATENT DOCUMENTS

CN 1417724 5/2003
CN 2678903 Y 2/2005
CN 103770393 5/2014

(Continued)

OTHER PUBLICATIONS

Scratch Panel for Scratch Card, Apr. 7, 2016, Available Online at: http://www.plasticcardonline.com/scratch-panel-card.html.

(Continued)

*Primary Examiner* — Justin V Lewis

(57) ABSTRACT

In one example of the disclosure, a substantially transparent substrate is provided at a printer. A primer layer is applied upon a first surface of the substrate. A security ink layer that includes security information is applied upon the primer layer. An opaque background ink layer is applied upon the security ink layer. A corona treatment is applied to a second surface, located on an opposite side of the substrate relative to the first surface. A release ink layer is applied upon the corona-treated second surface. An opaque cover image ink layer is applied upon the release ink layer.

12 Claims, 10 Drawing Sheets

(56) References Cited

FOREIGN PATENT DOCUMENTS

| | | | |
|---|---|---|---|
| CN | 104039555 | A | 9/2014 |
| CN | 105392851 | | 3/2016 |
| CN | 205354523 | | 6/2016 |
| CN | 106161147 | A | 11/2016 |
| CN | 106541722 | | 3/2017 |
| CN | 106716262 | A | 5/2017 |
| EP | 1839884 | A1 | 10/2007 |
| JP | 2002211178 | | 7/2002 |
| JP | 2002225471 | | 8/2002 |
| WO | WO-2007082365 | | 7/2007 |

OTHER PUBLICATIONS

Fishel, Catharine, "Mastering Materials, Bindings & Finishes", Shanghai People's Fine Arts Publishing House, Jan. 31, 2008, 16 pages.

* cited by examiner

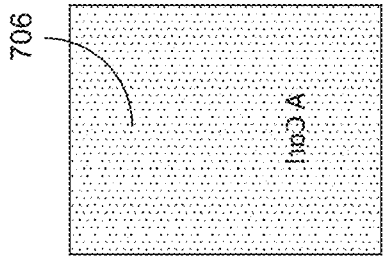
FIG. 7C
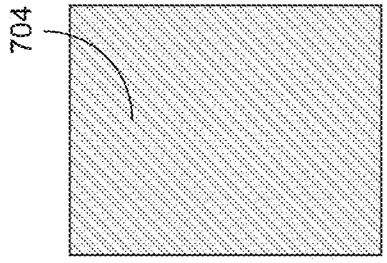
FIG. 7B
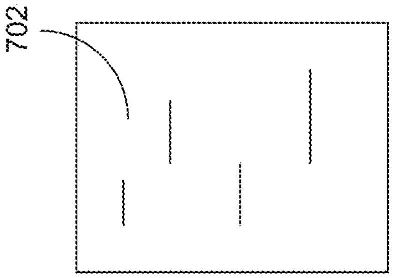
FIG. 7A
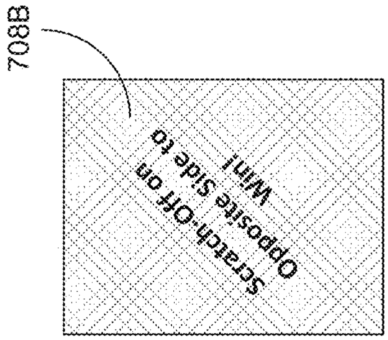
FIG. 7D2
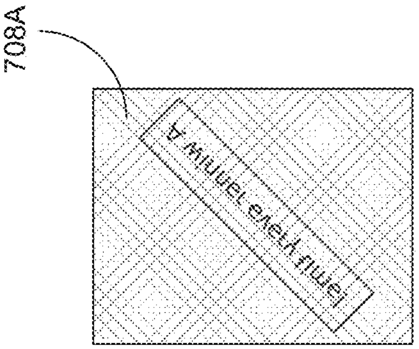
FIG. 7D1

SCRATCH-OFF STRUCTURE PRODUCTION

PRIORITY INFORMATION

This application is a divisional of U.S. National Stage Application Ser. No. 16/606,218 filed on Oct. 17, 2019, which claims priority to International Application No. PCT/EP2017/074333 filed on Sep. 26, 2017. The contents of which are incorporated herein by reference in its entirety.

BACKGROUND

There are applications for printed materials wherein an ink image is to be removed by an aggressive abrasion force (e.g., by a fingernail scratch, a coin scratch, or a special tape) in order that another image printed under the removed ink can be discovered. The covering ink image should be resistant to removal when exposed to normal abrasion forces. Such applications include scratch-off cards, peel-off cards, lottery tickets, and security printed images (e.g., authentication information on a bank card).

DRAWINGS

FIGS. 7A, 7B, 7C, 7D1, 7D2, 8A, 8B, 8C, 9A, and 9B illustrate an example of production of a scratch-off structure including a substantially transparent substrate layer.

Figure 10:
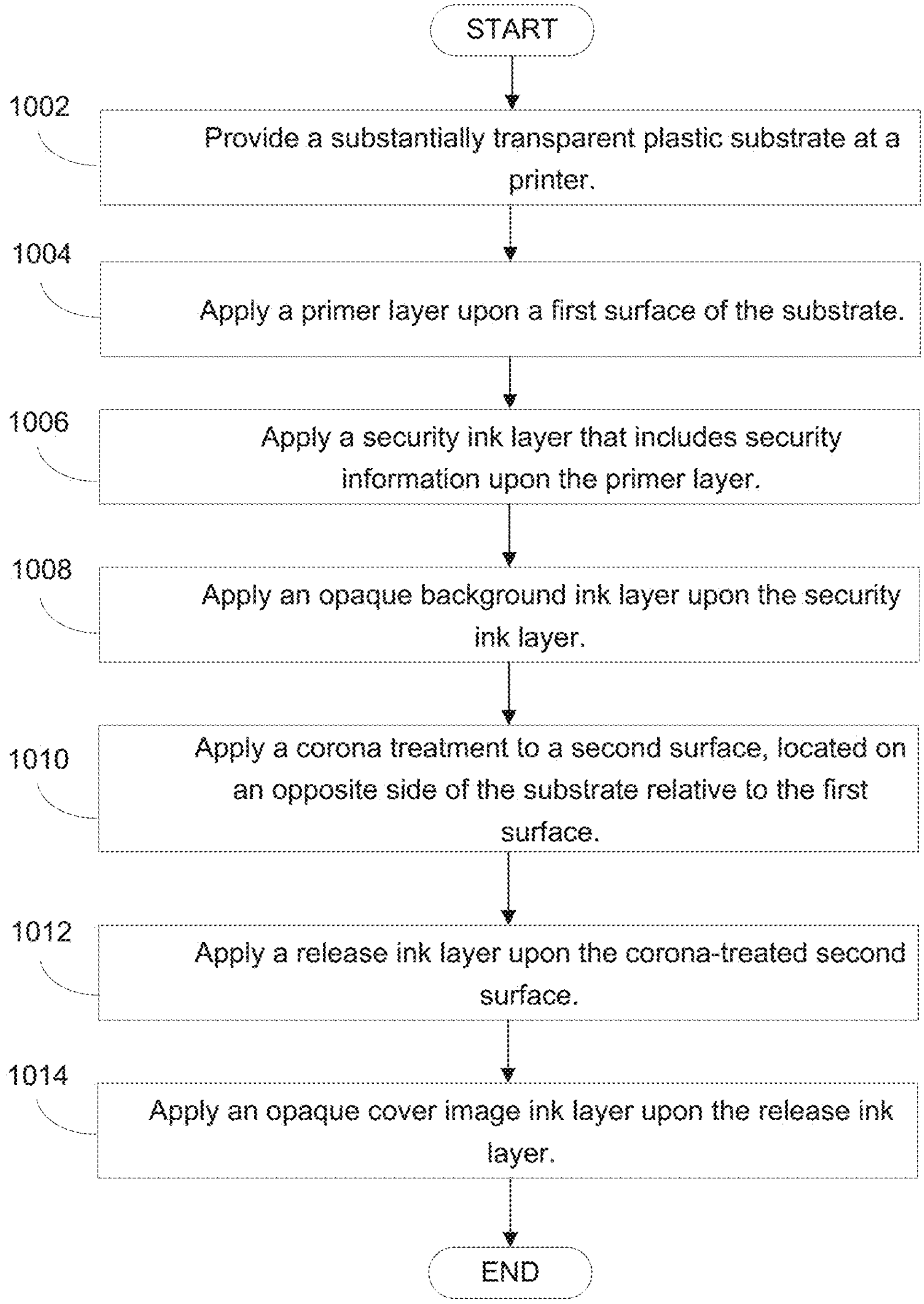

FIG. 10 is a flow diagram depicting implementation of an example of a method to produce a scratch-off structure including a substantially transparent substrate layer.

DETAILED DESCRIPTION

Using existing systems and methods, production of a scratch-off product can require multiple steps conducted at distinct printing apparatuses. In such scenarios, the valuable content that is to be hidden beneath a covering ink layer may be exposed to human eyes during the production, such that the overall level of security for the application is reduced. To address these issues, various examples described in more detail below provide a system and method for production of scratch-off structures including substantially transparent layers. In an example, a scratch-off structure production method includes providing a substantially transparent plastic substrate at a printer. A primer layer is applied upon a first surface of the substrate. A security ink layer that includes security information is applied upon the primer layer. An opaque background ink layer is applied upon the security ink layer. A corona treatment is applied to a second surface of the substrate, the second surface being located on an opposite side to the first surface of the substrate. A release ink layer is applied upon the corona-treated second surface. An opaque cover image ink layer is in turn applied upon the release ink layer.

In certain examples, the security ink layer, the opaque background ink layer, the release ink layer, and the opaque cover image layer may include electrostatic inks applied at the printer. In certain examples, applying the security ink layer upon the primer layer may include creating a security image in mirror-image format that is applied upon the primer layer. In certain examples, applying the opaque background in layer upon the security layer may include creating an image in mirror-image format.

In certain examples, each of the security ink layer, the opaque background ink layer, and the opaque cover image layer may include a colored ink, and the release ink layer may include an ink with release properties. Accordingly, when the opaque cover image ink layer is scratched with a hard surface, the release ink layer and the opaque cover image layer are to break into fragments to reveal the substantially transparent substrate. The security information of the security ink layer becomes visible through the substantially transparent fourth layer as a result of the release ink layer and the opaque cover image layer breaking into such fragments.

In certain examples, the printer may include a duplexer component and thereby has duplexing capabilities. In these examples, the printer may apply the primer layer, the security ink layer, and the opaque background ink layer occur as sequential impressions upon the first side of the substantially transparent substrate. Continuing with these examples, the printer may apply the release ink layer and the opaque cover image ink layer as sequential impressions upon the second side of the substantially transparent substrate. In a particular example, the substantially transparent substrate is a sheet substrate, and the duplex printer applies sequential impressions upon the first side of the substrate, and applies sequential impressions upon the second side of the substrate, utilizing a same print engine. In another particular example, the substantially transparent substrate is a web substrate. In this web substrate example, the duplex printer applies sequential impressions upon the first side of the substrate utilizing a first print engine, and applies sequential impressions upon the second side of the substrate utilizing a second print engine in line with the first print engine.

In examples, the disclosed method and system produces a scratch-off structure comprising the following layers in order: a first layer including a first opaque image; a second layer including security information; a third layer that is a primer layer applied upon a surface of a substantially transparent substrate; a fourth layer that is the substantially transparent plastic substrate; a fifth layer that is a release layer; and a sixth layer that includes a second opaque image. In examples, the second layer that includes security information and the sixth layer that includes an opaque image covering the release layer may be, or may include, colored electrostatic inks. In examples, the primer has been applied to a first surface of the substantially transparent substrate, and the opposite side of the substrate relative to the first surface has received a corona treatment. In an examples, the sixth layer with the opaque image may include a colored electrostatic ink, and with the fifth layer including an electrostatic ink with release properties such that, when the sixth layer is scratched with a hard surface, the fifth and sixth layers break into fragments to reveal the substantially transparent fourth layer.

In this manner users of the disclosed system and method should appreciate the simplicity and efficiency of utilizing a single printer to produce a scratch-off structure. As the disclosed production method and system can be performed at a single duplex printer, valuable hidden security content is not exposed to human eyes or cameras in the manner that can result where scratch-off production requires a substrate to be the subject of operations at multiple printing apparatuses. Manufacturers and providers of security structures, and the manufacturers and providers of the printers used in creating the security structures, will enjoy the competitive the benefits of offering the scratch-off production method and system described herein.

Figure 1:
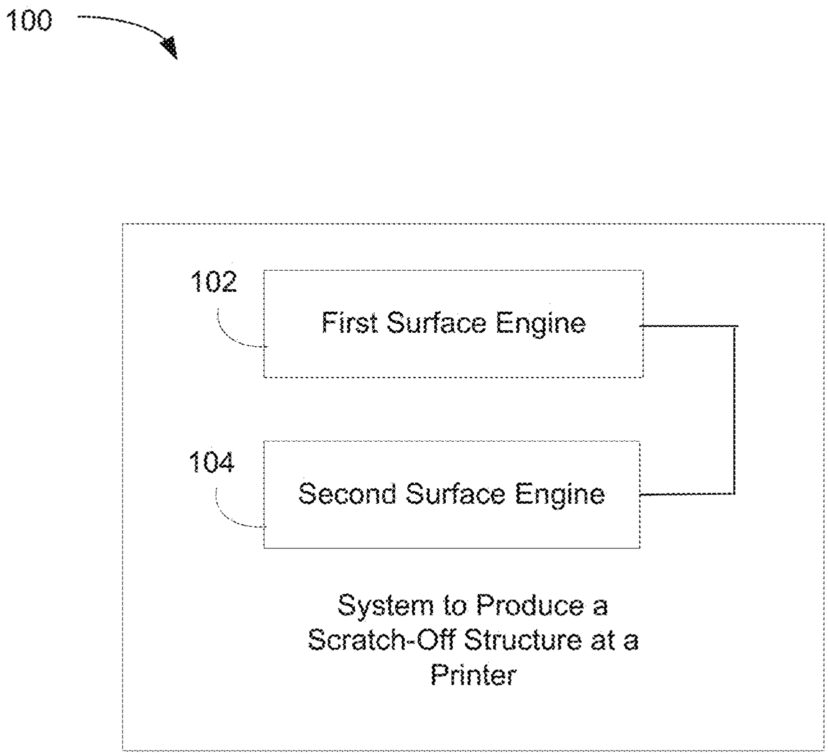
FIG. 1 illustrates an example of a system for producing a scratch-off structure including a substantially transparent substrate.
Figure 2:
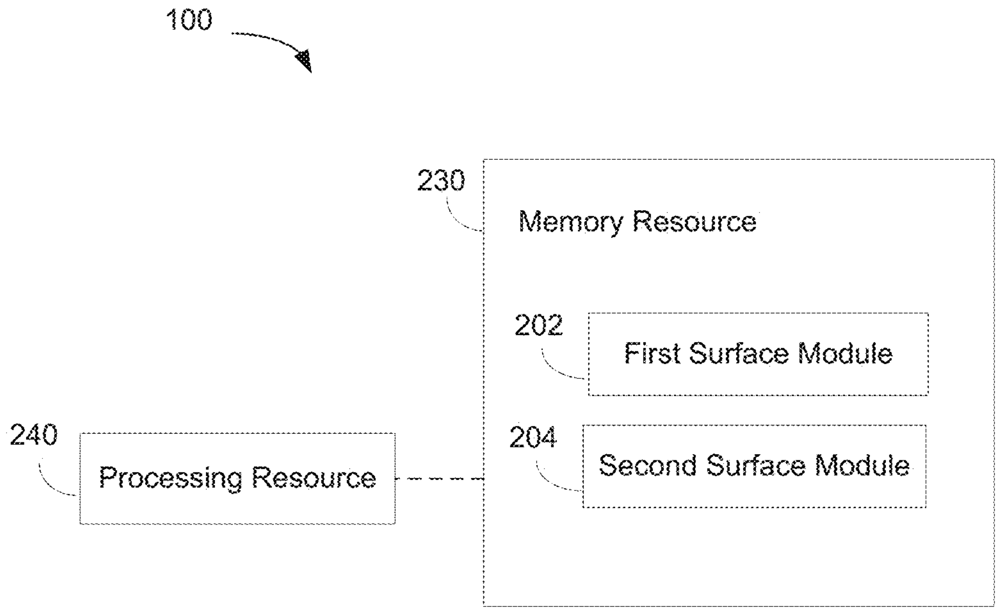
FIG. 2 is a block diagram depicting a memory resource and a processing resource to implement an example of a method to produce a scratch-off structure including a substantially transparent substrate.

FIGS. 1 and 2 depict examples of physical and logical components for implementing various examples. In FIG. 1 various components are identified as engines 102, and 104. In describing engines 102 and 104 focus is on each engine's designated function. However, the term engine, as used herein, refers generally to hardware and/or programming to perform a designated function. As is illustrated with respect to FIG. 2, the hardware of each engine, for example, may include one or both of a processor and a memory, while the programming may be code stored on that memory and executable by the processor to perform the designated function.

FIG. 1 illustrates an example of a system 100 for production of scratch-off structures. In this example, system 100 includes a first surface engine 102 and a second surface engine 104. In performing their respective functions, engines 102 and 104 may access a data repository, e.g., a memory accessible to system 100 that can be used to store and retrieve data.

In an example, first surface engine 102 represents generally a combination of hardware and programming to cause application of a primer layer upon a first surface of substantially transparent plastic substrate. As used herein, a "primer" refers generally to any substance used as a preparatory coat to optimize an underlying plastic substrate for printing with inks. In examples the primer is to help fix an ink layer upon a first surface of a plastic substrate. In examples, a plastic substrate may be any synthetic material made from a wide range of organic polymers including, but not limited to polyethylene, PVC, and nylon. In examples the plastic substrate may be a substrate that was molded into a shape, e.g. a sheet or web shape, while soft and then set into a rigid or slightly elastic form. As used herein, a "substantially transparent substrate" refers generally to a substrate that is clear, invisible, or substantially clear or substantially invisible to a human user.

As used herein an "ink" refers generally to any fluid that is to be applied to a media during a printing operation to form an image upon the media. In examples, the ink may be a highly viscous colored electrostatic ink utilized in LEP printing (e.g., CMY or K, or an on-press mixture of one or all of CMY and/or K, or a spot color formulation (a premixed ink that it usable at a press instead of, or in addition to, on-press mixtures of CMYK inks). Whereas certain inks used for inkjet or piezo printing may have a viscosity of approximately 1 cP to 50 cP, certain LEP electrostatic inks may have a viscosity of approximately 106 cP to 107 cP. It should be noted that for all viscosity measurements herein, unless otherwise stated, 25° C. is the temperature that is used. Such viscosities can be measured using an Anton Paar Rheometer or a CAP2000 rheometer from Brookfield Instruments.

First surface engine 102, following causing application of the primer layer, is to cause application of a security ink layer that includes security information upon the primer layer. As used In examples, the security information may be any high value information that is intended to be kept as secret until a user performs a scratch-off operation at the completed scratch-off structure. In particular examples, the security information may include a lottery ticket, a prize message, authentication information for a bank card, or any other information that will be valuable to a user when revealed by the scratch-off operation. In certain examples first surface engine 102, in applying the security ink layer upon the primer layer, creates an image in mirror-image format and places that image upon the primer layer. In this manner, the security ink layer will be readable through the substantially transparent plastic substrate when a user mechanically removes a release layer and opaque cover layer to reveal the substantially transparent plastic substrate.

It should be noted that though this disclosure frequently refers to a "scratch-off" operation, the term "scratch-off" is intended to encompass any application of mechanical force, and includes, without limitation a user using a fingernail or other hard surface to apply the force. "Scratch-off" also is intended to include applications of mechanical force by other means, such as any "peel-off" operation wherein a user applies mechanical force by a pulling motion (e.g., pulling a tab to reveal security information) versus a literal scratching motion.

First surface engine 102, following causing application of the security ink layer that includes security information upon the primer layer, is to cause application of an opaque background ink layer upon the security ink layer. The opaque background ink layer is to protect the security information layer from being viewed from first side of the scratch-off structure. In examples, the opaque background ink layer may include a color electrostatic ink or set of color electrostatic inks. In certain examples first surface engine 102, in applying the opaque background layer upon the security ink layer, is to create an image in mirror-image format and place that image upon the security ink layer. In this manner, the portions of the opaque background layer may be readable through the substantially transparent plastic substrate when a user mechanically removes a release layer and opaque cover layer to reveal the substantially transparent plastic substrate.

Second surface engine 104 represents generally a combination of hardware and programming to cause application of a corona treatment to a second surface of the substantially transparent substrate. This second surface is located on an opposite side of the substrate relative to the first surface described in preceding paragraphs. As used herein, a "corona treatment" refers generally to a high frequency discharge (e.g., from a corona discharge component) that increases the adhesion of a plastic surface. In examples, the corona treatment is to increase the surface energy of the substrate to allow improved wettability and adhesion of inks, coatings and adhesives. In examples, as electrons are accelerated into the surface of a plastic substrate, the long chains are caused to rupture, producing a multiplicity of open ends and forming free valences. Thus, in many circumstances a corona-treated substrate will demonstrate improved printing and coating quality.

Second surface engine 104, following causing application of the corona treatment to a second surface of the substantially transparent substrate, is to cause application of a release ink layer upon the corona-treated second surface. In examples, the release ink layer includes an ink with release properties such that, when the opaque cover image ink layer is scratched with a hard surface, the release ink layer and the opaque cover image layer are to break into fragments to reveal the substantially transparent substrate. The security information of the security ink layer is to become visible through the substantially transparent fourth layer when the substantially transparent substrate is thus revealed.

In certain examples, the release ink layer includes an additive that causes the release ink layer to be more removable, when exposed to a mechanical force, relative to the inks of the opaque background ink layer and the opaque cover image layer. In certain examples, the additive may comprise a fatty acid ester having a plurality of hydroxyl substituents. In certain examples, the electrostatic ink composition may comprise a fatty acid amide having a plurality of hydroxyl substituents. In some examples, the release additive may comprise a mixture of fatty acid esters and/or a mixture of fatty acid amides. In some examples, the mixture of fatty acid esters may be derived from a vegetable oil, for example, castor oil.

In the foregoing discussion of FIG. 1, engines 102 and 104 were described as combinations of hardware and programming. Engines 102 and 104 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement system 100 of FIGS. 1 and 2.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement system 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as first surface module 202 and second surface module 204. First surface module 202 represents program instructions that when executed by processing resource 240 may perform any of the functionalities described above in relation to first surface engine 102 of FIG. 1. Second surface module 204 represents program instructions that when executed by processing resource 240 may perform any of the functionalities described above in relation to second surface engine 104 of FIG. 1.

Figure 3:
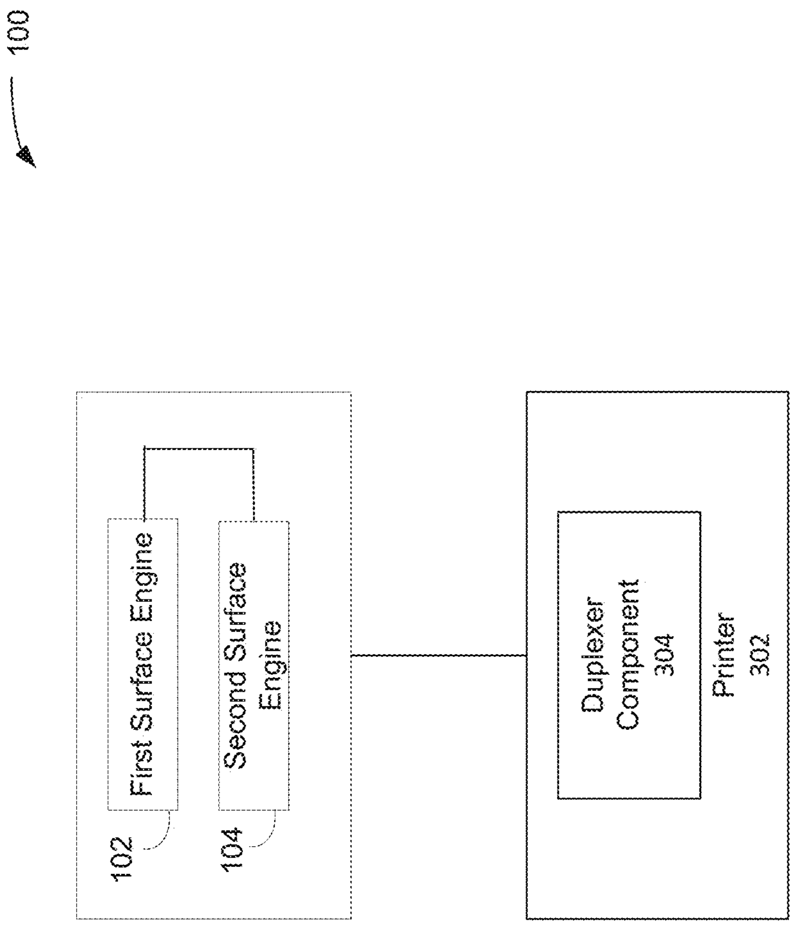
FIG. 3 illustrates an example of a system for producing at a duplexing printer a scratch-off structure including a substantially transparent substrate.

FIG. 3 illustrates an example of a system for producing at a duplexing printer a scratch-off structure including a substantially transparent substrate. In the example of FIG. 3, system 100 for production of scratch-off structures includes a printer 302 with a duplexer component 304. As used herein, a “duplexer component” refers generally to any component or set of components that enables automatic printing on both sides of a substrate. Automatic printing on both sides of a substrate is referred to generally herein as “duplex printing.” In an example, printer 302 with the duplexing component 304 applies a primer layer, applies a security ink layer, and applies an opaque background ink layer as a first set of sequential impressions made upon a first side of a substantially transparent substrate. Printer 302 with the duplexing component 304 additionally applies a release ink layer and applies an opaque cover image ink layer upon a second side of the substrate opposite the first side.

Figure 4:
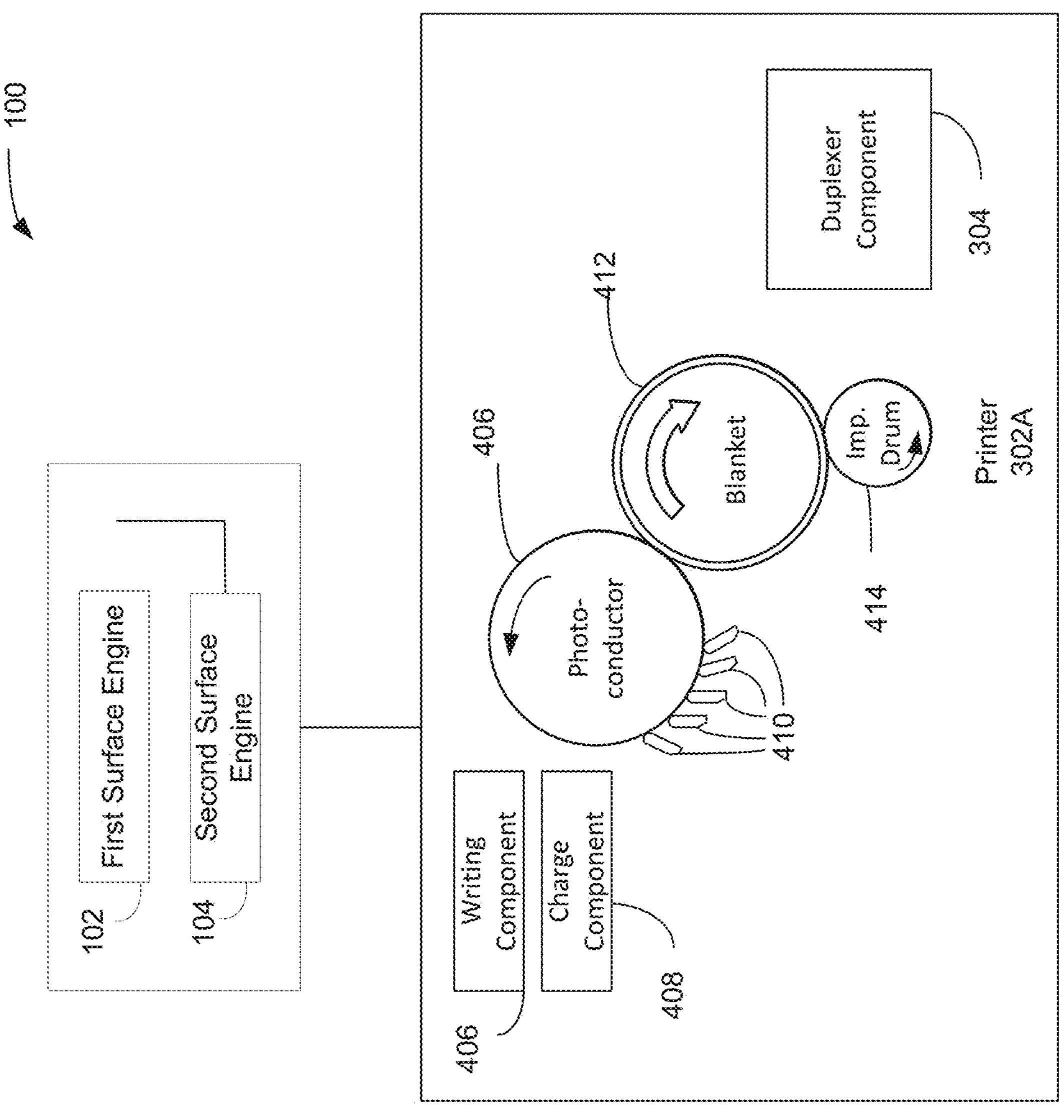
FIG. 4 illustrates a particular example of a system for producing at a duplexing printer a scratch-off structure utilizing a substantially transparent sheet substrate.

FIG. 4 illustrates a particular example of a system for producing at a duplexing printer a scratch-off structure utilizing a substantially transparent. In the example of FIG. 4, printer 302A is to print upon a substantially transparent sheet substrate using a print engine, and printer 302A is to apply sequential impressions upon the first side of the substrate and also to apply sequential impressions upon the second side of the substrate utilizing the same print engine. As used herein, a “print engine” refers generally to a set of components that are utilized to apply ink or ink layers to a substrate.

In a particular example printer 302A is a Liquid Electro-Photographic (“LEP”) printer, which may be used to print using a fluid print agents such as an electrostatic ink. Such electrostatic printing fluid includes electrostatically charged or chargeable particles (for example, resin or toner particles which may be colorant particles) dispersed or suspended in a carrier fluid).

In the particular example of FIG. 4, the print engine utilized for both first and second surface printing may include a writing component 404, a photoconductor component 406, a charge component 408, developer components 410, an intermediate transfer member or blanket component 412, and/or an impression drum component 414. In this example of duplex LEP printing, printer 302A may form an image on a print substrate by utilizing charge component 408 to place an electrostatic charge on photoconductor component (“PIP”) 406, and then utilize writing component 406 (e.g., a laser scanning unit or LEDs) to apply an electrostatic pattern of the desired image on the PIP to selectively discharge the PIP. The selective discharging forms a latent electrostatic image on the PIP. The printer 302A includes a set of developer components 410 to develop the latent image into a visible image by applying a thin layer of electrostatic ink (which may be generally referred to as “LEP ink”, or “electronic ink” in some examples) to the patterned PIP. Charged toner particles in the LEP ink adhere to the electrostatic pattern on the PIP to form a liquid ink image. The liquid ink image, including colorant particles and carrier fluid, is transferred from the PIP to an intermediate transfer member (referred to herein as a “blanket”) 412. The blanket may be heated until carrier fluid evaporates and colorant particles melt. The resulting molten film representative of the image is then applied to the surface of the sheet print substrate via pressure and tackiness.

There are typically two process methods for transferring a colored image from the photoreceptor to a sheet substrate. One method is a multi-shot process method in which the process described in the preceding paragraph is repeated a distinct printing separation for each color, and each color is transferred sequentially in distinct passes from the blanket to the substrate until a full image is achieved. With multi-shot printing, for each separation a molten film (with one color)

is applied to the surface of the print substrate. A second method for printing to a sheet substrate is a one-shot process in which multiple color separations are acquired on the blanket via multiple applications (each with one color) of liquid ink in from the PIP to the blanket, and then the acquired color separations are transferred in one pass from the blanket to the substrate.

In the single print engine example of FIG. 4A, duplexer component 304 may be any combination of hardware and programming that is to invert or a sheet of substrate such that the processes caused to be performed by first surface engine 102 and the processes caused to be performed by second surface engine 104 are effected using the components of a same print engine.

Figure 5:
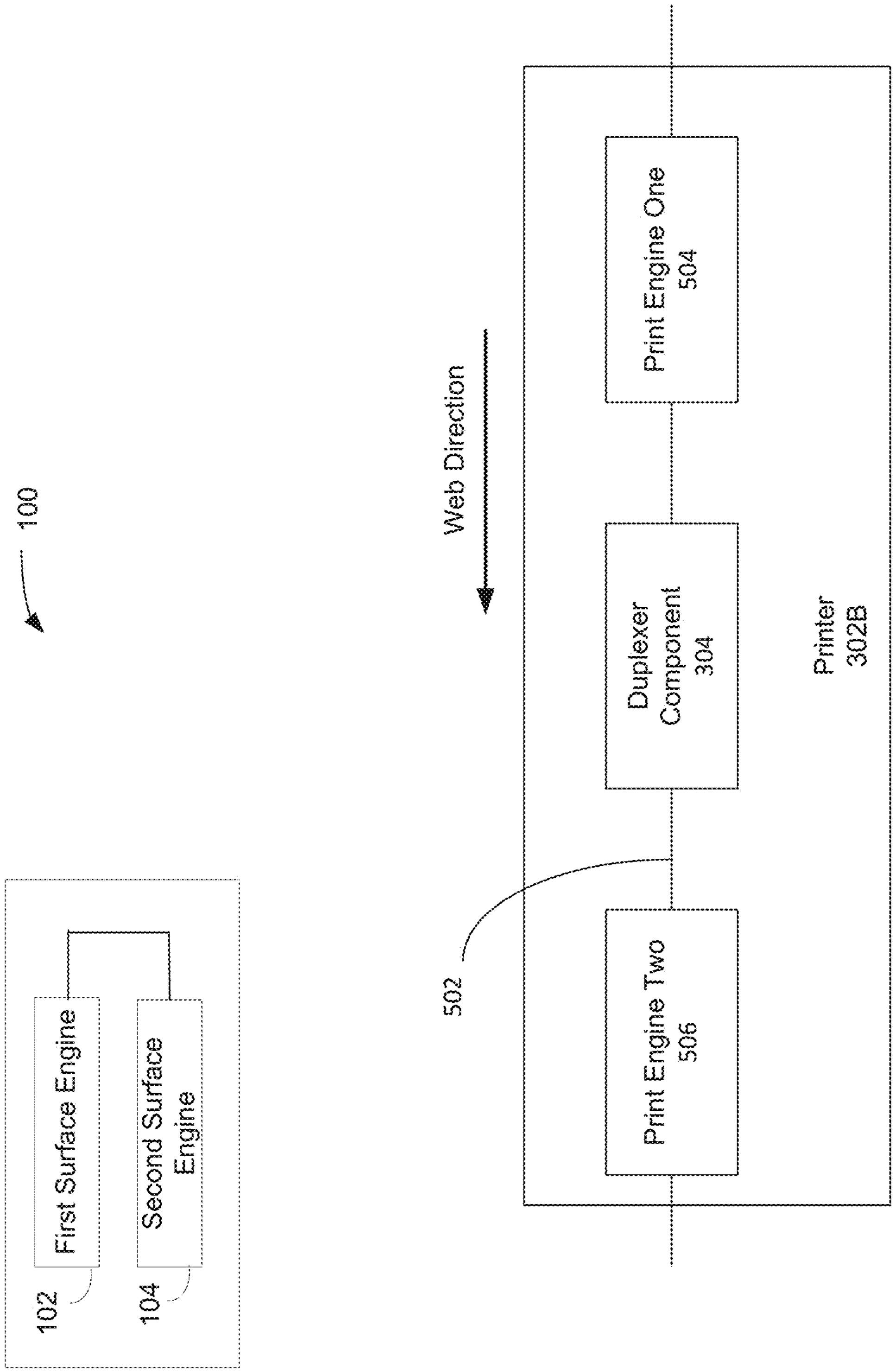
FIG. 5 illustrates a particular example of a system for producing at a duplexing printer a scratch-off structure utilizing a substantially transparent web substrate.

FIG. 5 illustrates another particular example of a system for producing at a duplexing printer a scratch-off structure utilizing a substantially transparent substrate. In this example, the substantially transparent web substrate 502 is a web substrate, and the duplexing printer applies sequential impressions upon the first side of the web substrate utilizing a first print engine, and applies sequential impressions upon the second side of the web substrate utilizing a second print engine in line with the first print engine. As used herein, first and second print engines being "in-line" with another refers generally to the upstream first and the downstream second print engines being situated to print in sequence or concurrently upon a common or same web substrate. As used herein, the terms "downstream" and "upstream" are relative to a direction of travel of a web substrate as the web substrate moves through the in-line print system.

In the particular example of FIG. 5, printer 302B is a LEP printer, which may be used to print using a fluid print agents such as an electrostatic ink. Printer 302B includes a first print engine 504, a duplexer component 304 downstream from the first print engine, and a second print engine 506 that is downstream from duplexer component 304. In an example, first print engine 504 and second print engine 506 may each be LEP print engines such as the LEP print engine 302A depicted at FIG. 4. Duplexer component 304 may be any combination of hardware and programming that is to invert or a sheet of substrate such that the processes caused to be performed by first surface engine 102 of system 100 for production scratch-off structures can be performed utilizing the upstream first print engine 504, and the processes caused to be performed by second surface engine 104 of system 100 of can be performed utilizing the downstream second print engine 506.

Figure 6:
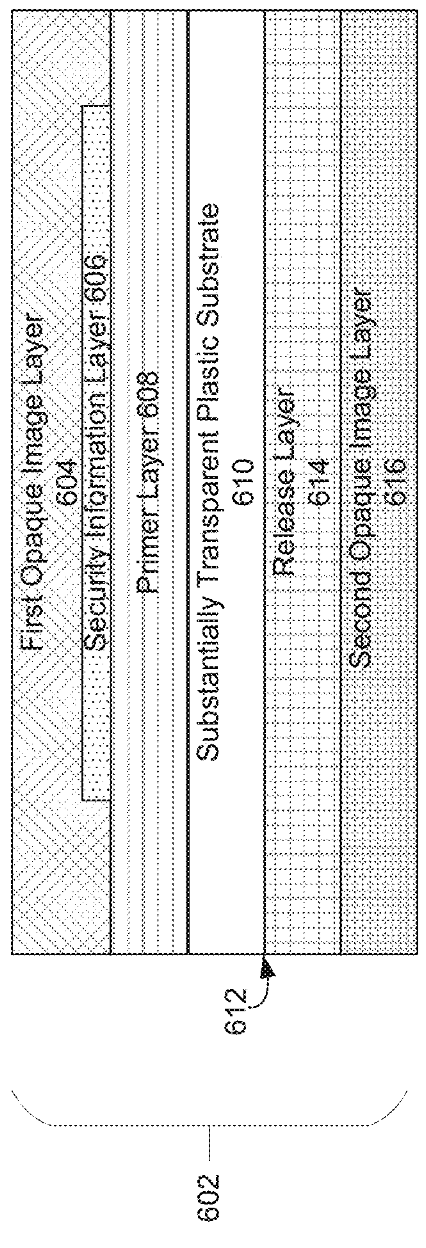
FIG. 6 illustrates an example of a manufactured scratch-off structure including a substantially transparent layer.

FIG. 6 illustrates an example of a scratch-off structure 602 including a substantially transparent layer, as may be produced utilizing the method and system disclosed herein. In this example, scratch-off structure 602 comprises a first opaque image layer 604 that includes a first opaque image formed with colored electrostatic ink. The first opaque image layer is to serve as a background that will hide the security information such that the security information cannot be viewed from a back side (e.g., non-operative side) of the finished scratch-off structure.

A security information layer 606 of the scratch-off structure, adjacent to first layer 604, includes the security information this is to remain hidden until a user performs a scratch-off operation at the finished scratch-off product. In some examples the security information may be printed in mirror image format with colored electrostatic ink such that the security information is readable through a substantially transparent substrate after the user scratch-off operation on the opposite side of the scratch-off structure.

Scratch-off structure 602 includes a primer layer, adjacent to the security information layer, that has been applied upon a first surface of a substantially transparent plastic substrate. The substantially transparent plastic substrate itself is makes up another layer of scratch-off structure. In this example, a second surface of the substantially transparent plastic surface, on an opposite surface of the substrate relative to the first surface, is a corona-treated surface 612.

Continuing at FIG. 6, scratch-off structure 602 includes a release layer 614 that has been applied upon the corona-treated surface. In examples, the release layer may be formed with one or more colored electrostatic inks and includes additives or release properties such that, when a second opaque image layer 616 is scratched with a hard surface, the release layer 614 and the second opaque image layer 616 break into fragments to reveal the substantially transparent plastic substrate layer. In examples, the second opaque image layer 616 includes a colored electrostatic ink, and is to cover and protect the release layer such that any inadvertent and ordinary forces upon the scratch-off side of the scratch-off structure do cause revealing of the substantially transparent plastic substrate and the security information layer beneath the substantially transparent layer. In certain examples, the release layer 614 may include, in addition to a colored electrostatic ink with release properties, an electrostatic ink without release properties, e.g., a standard electrostatic black ink and/or a standard electrostatic white ink.

FIGS. 7A, 7B, 7C, 7D1, 7D2, 8A, 8B, 8C, 9A, and 9B illustrate an example of production of a scratch-off structure including a substantially transparent substrate layer. Starting at FIG. 7A, in this example of a system 100 for production of scratch off structures, a substantially transparent plastic substrate 702 is provided at a printer. Moving to FIG. 7B, a primer layer 704 is applied upon a first surface of the substantially transparent substrate. Moving FIG. 7C, a security ink layer 706 is applied upon the primer layer 704. In this example the security layer 706 includes the security information image "A Car." The security information image is created and applied in mirror-image format so that the image will be readable through the substantially transparent plastic substrate when a user mechanically removes a release layer and opaque cover layer to reveal the substantially transparent plastic substrate.

Moving to FIG. 7D1, an opaque background ink layer 708A is applied upon the security ink layer (706 FIG. 7C). In this example, in applying the opaque background layer upon the security ink layer, a background image "A winner every time!" is created and applied in mirror-image format and placed upon the security ink layer. In this manner, the "A winner every time" portion of the opaque background layer will be readable through the substantially transparent plastic substrate when a user mechanically removes a release layer and opaque cover layer to reveal the substantially transparent plastic substrate.

Moving to FIG. 7D2, as an alternative to the opaque background layer 703A of FIG. 7D1, an opaque background ink layer 708B may be applied upon the security ink layer 706 (FIG. 7C). In this example, in applying the opaque background layer upon the security ink layer, a back-side image "Scratch-Off on Opposite Side to Win!" may be created and applied in regular facing format (versus mirror-image format) and placed upon the security ink layer. In this manner, the "Scratch-Off on Opposite Side to Win!" portion of the opaque background layer will be readable on the side of the finished scratch-off structure opposite the scratch-off side and can serve as an instructive and/or decorative image.

Figure 8A:
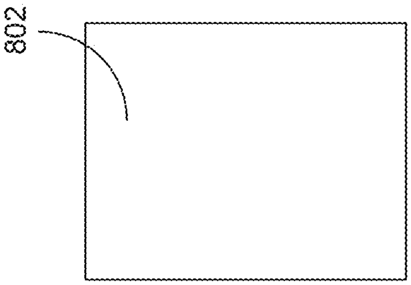
Figure 8B:
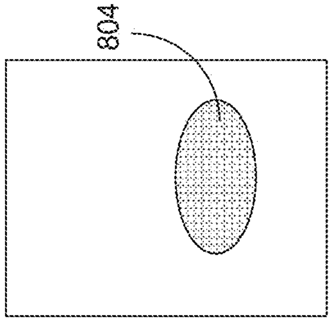

Moving to FIG. 8A, a corona treatment 802 is applied to a second surface of the substantially transparent plastic substrate 702, located on an opposite side of the substrate relative to the first surface. Moving to FIG, 8B, a release ink layer 804 is applied upon the corona-treated second surface. In examples, release layer 804 may be formed with one or more colored electrostatic inks and may include additives or release properties such that, when a second opaque image layer 806 is scratched with a hard surface, release layer 804 and the second opaque image layer 806 are to break into fragments to reveal the substantially transparent plastic substrate layer 702 and security layer 706 including the security information image "A Car."

Figure 8C:
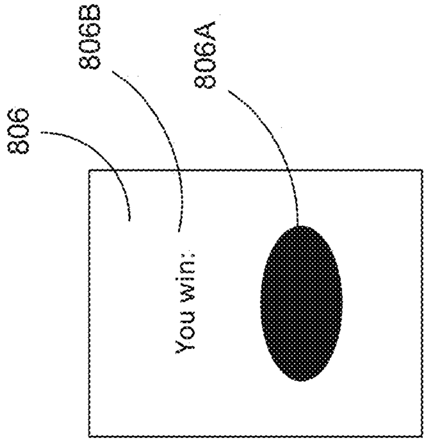

Moving to FIG. 8C, the opaque cover image ink layer 806 described in the preceding paragraph is applied upon the release ink layer. In this example, the opaque cover image ink layer 806 includes an oval FIG. 806A that covers the release layer 804 (FIG. 8B) in a way that makes the scratch-off portion resistant to removal when exposed to normal abrasion forces, and also includes a "You win:" message 806B that is viewable on the scratch-off structure before any scratch-off forces are applied by the user.

Figure 9B:
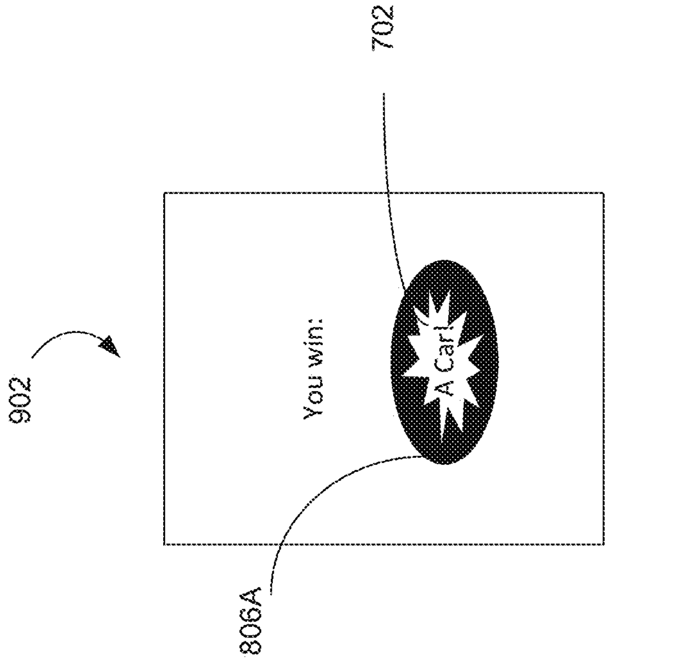
Figure 9A:
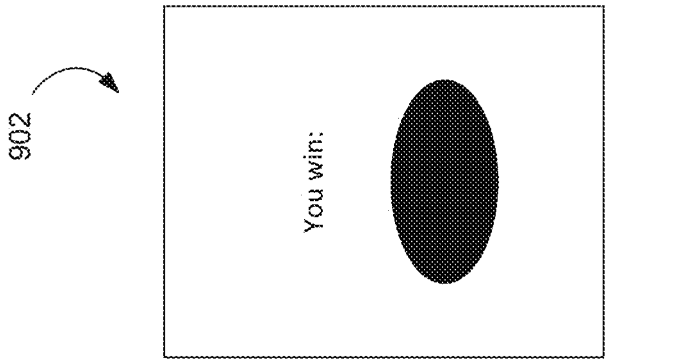

Moving to FIG. 9A, a user may be provided with a finished scratch-off structure 902 manufactured as described in the description of FIGS. 7A, 7B, 7C, 7D1, 7D2, 8A, 8B, and 8C. Moving to FIG. 9B, such user may scratch a portion of the opaque cover image ink layer 808A with a hard surface (e.g., a fingernail, a scratch-off tool, a pull-tab, etc.). As a result of such scratching, the release ink layer 804 (FIG. 8B) and the opaque cover image layer 806A are to break into fragments to reveal the substantially transparent plastic substrate 702 (FIG. 7A). The security information "A Car!" of the security ink layer 706 (FIG. 7C) becomes visible through the substantially transparent plastic substrate 702 as a result of the release ink layer and the opaque cover image layer breaking into such fragments.

FIG. 10 is a flow diagram of implementation of a method for production of scratch-off structures. In discussing FIG. 10, reference may be made to the components depicted in FIGS. 1 and 2. Such reference is made to provide contextual examples and not to limit the manner in which the method depicted by FIG. 10 may be implemented. A substantially transparent substrate is provided at a printer (block 1002). Referring back to FIGS. 1 and 2, first surface engine 102 (FIG. 1) or first surface module 202 (FIG. 2), when executed by processing resource 240, may be responsible for implementing block 1002.

A primer layer is applied upon a first surface of the substrate (block 1004). Referring back to FIGS. 1 and 2, first surface engine 102 (FIG. 1) or first surface module 202 (FIG. 2), when executed by processing resource 240, may be responsible for implementing block 1004.

A security ink layer that includes security information is applied upon the primer layer (block 1006). Referring back to FIGS. 1 and 2, first surface engine 102 (FIG. 1) or first surface module 202 (FIG. 2), when executed by processing resource 240, may be responsible for implementing block 1006.

An opaque background ink layer is applied upon the security ink layer (block 1008). Referring back to FIGS. 1 and 2, first surface engine 102 (FIG. 1) or first surface module 202 (FIG. 2), when executed by processing resource 240, may be responsible for implementing block 1008.

A corona treatment is applied to a second surface, located on an opposite side of the substrate relative to the first surface (block 1010). Referring back to FIGS. 1 and 2, second surface engine 104 (FIG. 1) or second surface module 204 (FIG. 2), when executed by processing resource 240, may be responsible for implementing block 1010.

A release ink layer is applied upon the corona-treated second surface (block 1012). Referring back to FIGS. 1 and 2, second surface engine 104 (FIG. 1) or second surface module 204 (FIG. 2), when executed by processing resource 240, may be responsible for implementing block 1012.

An opaque cover image ink layer is applied upon the release ink layer (block 1014). Referring back to FIGS. 1 and 2, second surface engine 104 (FIG. 1) or second surface module 204 (FIG. 2), when executed by processing resource 240, may be responsible for implementing block 1014.

FIGS. 1-10 aid in depicting the architecture, functionality, and operation of various examples. In particular, FIGS. 1-6 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 10 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A non-transitory memory resource storing machine-readable instructions stored thereon that cause a processor to:

instruct a print engine to apply a primer layer on a first side of a substantially transparent substrate;

instruct a print engine to apply a security ink layer to generate security information on the primer layer such that the security information is viewable from a second side of the substantially transparent substrate; and instruct a duplexer to return the substantially transparent substrate to the print engine to apply a release ink layer on the second side of the substantially transparent substrate.

2. The memory resource of claim 1, comprising instructions to cause a duplexer to return the substantially transparent substrate to the print engine to apply the release ink layer on the second side of the substantially transparent substrate.

3. The memory resource of claim 1, comprising instructions to cause the print engine to apply the security ink layer in a mirror-image format to be viewable through the substantially transparent substrate from the second side when the release ink layer is removed.

4. The memory resource of claim 1, comprising instructions to cause an application of an opaque background layer on the first side of the substantially transparent substrate to cover the security ink layer.

5. The memory resource of claim 4, wherein the security ink layer is positioned between the opaque background layer and the primer layer.

6. A scratch-off structure, comprising:

a substantially transparent substrate that includes a first side and a second side;

a primer layer positioned on the first side of the substantially transparent substrate;

a security ink layer to generate security information positioned on the primer layer such that the security information is viewable from the second side of the substantially transparent substrate;

a first opaque background layer positioned on the security ink layer;

a release ink layer positioned on the second side of the substantially transparent substrate, wherein the release ink layer includes a fatty acid ester having a plurality of hydroxyl substituents; and a second opaque background layer positioned on the release ink layer.

7. The scratch-off structure of claim 6, wherein the substantially transparent substrate is a plastic sheet substrate.

8. The scratch-off structure of claim 6, wherein the release ink layer and a second opaque background layer is breakable into fragments and is removable from the second side of the substantially transparent substrate when a force is applied to the release ink layer and the second opaque background layer.

9. The scratch-off structure of claim 8, wherein the substantially transparent substrate protects the security ink layer from the force applied to the release ink layer and the second opaque background.

10. A system to cause production of a scratch-off structure at a printer, comprising:

a duplexer component to alter a substantially transparent substrate from a first side to a second side to allow a print engine to apply layers on the first side and the second side; and a print engine to:

apply a primer layer on the first side of the substantially transparent substrate;

apply a security ink layer to generate security information on the primer layer such that the security information is viewable from the second side of the substantially transparent substrate;

apply a first opaque background layer on the security ink layer;

apply a release ink layer on the second side of the substantially transparent substrate; and apply a second opaque background layer on the release ink layer a corona discharge component to:

apply a corona treatment to the second side of the substantially transparent substrate prior to the print engine applying the release ink layer on the second side of the substantially transparent substrate.

11. The system of claim 10, wherein the release ink layer includes a fatty acid ester having a plurality of hydroxyl substituents.

12. The system of claim 10, wherein the primer layer, the security ink layer, and the first opaque background layer are applied by the print engine as a first sequential impression and the release ink layer and the second opaque background layer are applied by the print engine as a second sequential impression.

* * * * *